United States Patent
Gupta et al.

(10) Patent No.: US 9,394,383 B2
(45) Date of Patent: *Jul. 19, 2016

(54) MONOMER/DILUENT RECOVERY

(71) Applicant: Chevron Phillips Chemical Company LP, The Woodlands, TX (US)

(72) Inventors: Anurag Gupta, Sugar Land, TX (US); Timothy O. Odi, Kingwood, TX (US); Ralph W. Romig, Kingwood, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/725,954

(22) Filed: May 29, 2015

(65) Prior Publication Data
US 2015/0259441 A1    Sep. 17, 2015

Related U.S. Application Data

(63) Continuation of application No. 14/159,261, filed on Jan. 20, 2014, now Pat. No. 9,096,694.

(51) Int. Cl.
*C08F 2/00* (2006.01)
*C08F 210/00* (2006.01)
(Continued)

(52) U.S. Cl.
CPC . *C08F 2/34* (2013.01); *B01J 19/18* (2013.01); *B01J 19/245* (2013.01); *C08F 2/01* (2013.01);
(Continued)

(58) Field of Classification Search
CPC .... B01J 8/007; B01J 19/1818; B01J 19/1837; B01J 2208/00176; B01J 2208/00619; B01J 2219/00024; B01J 2219/00031; B01J 2219/00033; B01J 2219/0004; B01J 2219/00094; B01J 2219/00184; B01J 2219/00254; C08F 10/02; C08F 2/14; C08F 2/01; C08F 2/001; C08F 110/02; C08F 210/16; C08F 210/14; Y10T 29/49716
USPC ............ 526/65, 348; 422/132, 134; 528/501; 29/401.1
See application file for complete search history.

(56) References Cited

U.S. PATENT DOCUMENTS 3,248,179 A    4/1966  Norwood
4,312,967 A    1/1982  Norwood et al.
(Continued)

FOREIGN PATENT DOCUMENTS

EP    0891990 A2    1/1999
EP    1630178       3/2006
(Continued)

OTHER PUBLICATIONS

International Patent Application PCT/US2105/011757 Search Report dated Apr. 24, 2015.
(Continued)

*Primary Examiner* — William Cheung
(74) *Attorney, Agent, or Firm* — Conley Rose, P.C.; Rodney B. Carroll; Monte R. Rhodes

(57) ABSTRACT

The disclosure includes a polymerization process and an olefin polymerization system. A polymerization product is produced, a vapor phase is recovered from the polymerization product, the vapor phase is fractionated in a first column to yield a fraction stream, and the fraction stream is fractionated in a second column. A first stream of the second column, which comprises a diluent, can be recycled to a first polymerization reactor. A second stream of the second column, which comprises olefin monomer, diluent, and hydrogen, can be recycled to a second polymerization reactor. Comonomer may be recycled from the first column to the first polymerization reactor, the second polymerization reactor, or both.

19 Claims, 1 Drawing Sheet

(51) Int. Cl.
  *B01J 19/18* (2006.01)
  *C08F 6/00* (2006.01)
  *B21K 21/16* (2006.01)
  *C08F 2/34* (2006.01)
  *C08F 2/01* (2006.01)
  *C08F 6/04* (2006.01)
  *B01J 19/24* (2006.01)
  *C08F 210/16* (2006.01)

(52) U.S. Cl.
  CPC . *C08F 6/003* (2013.01); *C08F 6/04* (2013.01); *C08F 210/16* (2013.01); *B01J 2219/24* (2013.01); *C08F 2500/05* (2013.01)

(56) References Cited

U.S. PATENT DOCUMENTS

| | | |
|---|---|---|
| 4,501,885 A | 2/1985 | Sherk et al. |
| 4,588,790 A | 5/1986 | Jenkins, III et al. |
| 4,589,957 A | 5/1986 | Sherk et al. |
| 5,016,857 A | 5/1991 | Bovee et al. |
| 5,352,749 A | 10/1994 | DeChellis et al. |
| 5,436,304 A | 7/1995 | Griffin et al. |
| 5,455,314 A | 10/1995 | Burns et al. |
| 5,565,174 A | 10/1996 | Burns et al. |
| 5,565,175 A | 10/1996 | Hottovy et al. |
| 5,575,979 A | 11/1996 | Hanson |
| 6,045,661 A | 4/2000 | Kreischer et al. |
| 6,239,235 B1 | 5/2001 | Hottovy et al. |
| 6,262,191 B1 | 7/2001 | Hottovy et al. |
| 6,559,247 B2 | 5/2003 | Kufeld et al. |
| 6,815,511 B2 | 11/2004 | Verser et al. |
| 6,833,415 B2 | 12/2004 | Kendrick et al. |
| 7,163,906 B2 | 1/2007 | McDaniel et al. |
| 7,619,047 B2 | 11/2009 | Yang et al. |
| 7,759,457 B2 | 7/2010 | Walworth |
| 7,790,820 B2 | 9/2010 | Jensen et al. |
| 7,960,487 B2 | 6/2011 | Yang et al. |
| 7,964,699 B2 | 6/2011 | Marissal et al. |
| 8,597,582 B2 | 12/2013 | Hottovy et al. |
| 8,653,206 B2 | 2/2014 | Gessner et al. |
| 8,710,161 B2 * | 4/2014 | Fouarge ................ B01J 8/007 29/401.1 |
| 8,871,886 B1 | 10/2014 | Hottovy et al. |
| 8,883,940 B2 | 11/2014 | Kufeld et al. |
| 8,921,498 B2 | 12/2014 | Kufeld et al. |
| 9,096,694 B1 * | 8/2015 | Gupta ................ B01J 19/18 |
| 2004/0136881 A1 | 7/2004 | Verser et al. |
| 2005/0272914 A1 | 12/2005 | McElvain et al. |
| 2009/0004417 A1 | 1/2009 | Follestad et al. |
| 2010/0144985 A1 | 6/2010 | Lee et al. |
| 2011/0190465 A1 | 8/2011 | Hottovy et al. |
| 2014/0343236 A1 | 11/2014 | Hottovy et al. |
| 2015/0011718 A1 | 1/2015 | Kufeld et al. |

FOREIGN PATENT DOCUMENTS

| | | |
|---|---|---|
| EP | 1914247 A1 | 4/2008 |
| EP | 2336200 | 6/2011 |
| WO | 2004024780 A1 | 3/2004 |
| WO | 2006056763 A1 | 6/2006 |
| WO | 2009127643 A1 | 10/2009 |
| WO | 2014070608 A1 | 5/2014 |
| WO | 2014093088 | 6/2014 |
| WO | 2015109184 A1 | 7/2015 |

OTHER PUBLICATIONS

Filing receipt and specification for patent application entitled "Polymerization Product Pressures in Olefin Polymerization," by John D. Hottovy, et al., filed on Jul. 28, 2015 as U.S. Appl. No. 14/810,734.
Foreign communication from a related counterpart application—International Search Report and Written Opinion, PCT/US2015/011757, Apr. 24, 2015, 9 pages.
Filing receipt and specification for patent application entitled "Monomer/Diluent Recovery," by Anurag Gupta, et al., filed Jan. 20, 2014 as U.S. Appl. No. 14/159,261.
Foreign communication from a related counterpart application—International Search Report and Written Opinion, PCT/US2013/066842, Jan. 22, 2014, 9 pages.
Office Action dated May 20, 2015 (27 pages), U.S. Appl. No. 14/447,973, filed Jul. 31, 2014.
Office Action dated Mar. 3, 2015 (29 pages), U.S. Appl. No. 14/159,261, filed Jan. 20, 2014.
Notice of Allowance dated Jun. 10, 2015 (11 pages), U.S. Appl. No. 14/159,261, filed Jan. 20, 2014.
Notice of Allowance dated Jun. 25, 2015 (12 pages), U.S. Appl. No. 14/159,261, filed Jan. 20, 2014.
Notice of Allowance dated Jun. 4, 2015 (8 pages), U.S. Appl. No. 14/447,973, filed Jul. 31, 2014.
Office Action dated Jun. 26, 2015 (34 pages), U.S. Appl. No. 14/492,527, filed Sep. 22, 2014.
Foreign communication from a related counterpart application—International Preliminary Report on Patentability, PCT/US2013/066842, May 5, 2015, 7 pages.
Office Communication regarding a third-party submission dated Jul. 22, 2015 (23 pages), U.S. Appl. No. 14/492,527, filed Sep. 22, 2014.
Filing receipt and specification for patent application entitled "Pressure Management for Slurry Polymerization," by Scott E. Kufeld, et al., filed Dec. 8, 2015 as U.S. Appl. No. 14/962,228.
Notice of Allowance dated Oct. 1, 2015 (17 pages), U.S. Appl. No. 14/492,527, filed Sep. 22, 2014.

\* cited by examiner

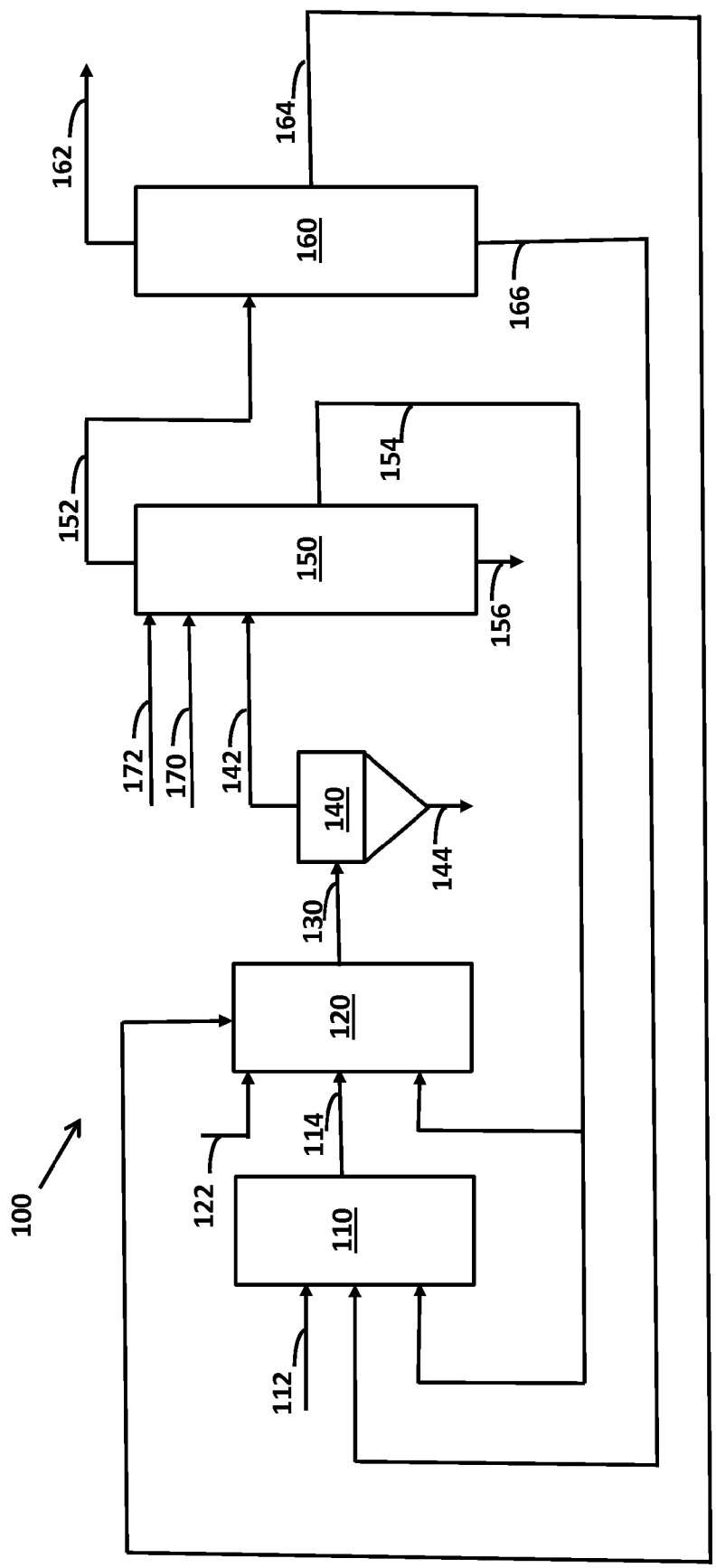

MONOMER/DILUENT RECOVERY

CROSS-REFERENCE TO RELATED APPLICATIONS

This application is a continuation of U.S. patent application Ser. No. 14/159,261, filed Jan. 20, 2014, now U.S. Pat. No. 9,096,694 entitled "Improved Monomer/Diluent Recover," which is hereby incorporated herein by reference in its entirety for all purposes.

STATEMENT REGARDING FEDERALLY SPONSORED RESEARCH OR DEVELOPMENT

Not applicable.

REFERENCE TO A MICROFICHE APPENDIX

Not applicable.

FIELD

This disclosure relates to the recovery of monomer and diluent in olefin polymerization processes and systems.

BACKGROUND

Polyolefins can be prepared by polymerization of olefins in one or more reactors where feed materials such as diluent, monomer, comonomer and catalyst are introduced. The polymerization reaction yields one or more solid polyolefins in a polymerization product. The solid polyolefin can be recovered, and remaining portions of the polymerization product can be further processed, for example, according to techniques disclosed in U.S. Pat. No. 4,589,957. An ongoing need exists for alternative and/or improved techniques for processing the remaining portions of the polymerization product.

SUMMARY

Disclosed embodiments include a polymerization process comprising producing a polymerization product; recovering a vapor phase from the polymerization product; fractionating the vapor phase in a first column to yield a fraction stream; fractionating the fraction stream in a second column; emitting a first stream and a second stream from the second column, wherein the first stream comprises a diluent, wherein the second stream comprises an olefin monomer, the diluent, and hydrogen; recycling at least a portion of the diluent of the first stream to a first polymerization reactor; and recycling at least a portion of the diluent, at least a portion of the olefin monomer, and at least a portion of the hydrogen of the second stream to a second polymerization reactor.

Disclosed embodiments also include an olefin polymerization system comprising a first polymerization reactor yielding a first component of solid polymer of a polymerization product; a second polymerization reactor yielding a second component of the solid polymer of the polymerization product, wherein the second polymerization reactor is in fluid communication with the first polymerization reactor; at least one separator receiving the polymerization product from the first polymerization reactor, the second polymerization reactor, or both, wherein the separator yields a vapor stream; a first column receiving the vapor stream from the separator, wherein the first column yields a fraction stream; and a second column receiving the fraction stream from the first column, wherein the second column yields a first stream comprising a diluent and a second stream comprising the diluent, an olefin monomer, and hydrogen; wherein at least a portion of the diluent of the first stream flows to the first polymerization reactor, wherein at least a portion of the diluent, at least a portion of the monomer, and at least a portion of the hydrogen of the second stream flows to the second polymerization reactor.

BRIEF DESCRIPTION OF THE DRAWINGS

FIG. 1 shows a process flow diagram of an embodiment of an olefin polymerization system according to the disclosure.

DETAILED DESCRIPTION OF THE EMBODIMENTS

Disclosed herein are embodiments of olefin polymerization systems and processes which provide for improved diluent/monomer recovery.

FIG. 1 shows a process flow diagram of an embodiment of an olefin polymerization system 100 according to the disclosure. The system 100 may comprise a first polymerization reactor 110 which yields a first component of a solid polymer of a polymerization product; a second polymerization reactor 120 in fluid communication with the first polymerization reactor 110 and which yields a second component of the solid polymer of the polymerization product; at least one separator 140 which receives the polymerization product from the first polymerization reactor 110, from the second polymerization reactor 120, or both; a first column 150 in fluid communication with the at least one separator 140; and a second column 160 in fluid communication with the first column 150.

The separator 140 may yield a vapor stream 142 comprising a vapor phase and a product stream 144 comprising solid polymer. Solid polymer may be recovered from product stream 144 for subsequent use, processing, sale, etc. The first column 150 may receive the vapor stream 142 comprising the vapor phase from the separator 140. The first column 150 may yield a fraction stream 152, a side-draw stream 154, a bottoms stream 156, or combinations thereof. One or more components of the bottoms stream 156 may flow outside system 100 for subsequent processing, use, sale, or combinations thereof. At least a portion of the side-draw stream 154 comprising olefin comonomer may flow to the first polymerization reactor 110, to the second polymerization reactor 120, or both. The second column 160 may receive the fraction stream 152 from the first column 150. The second column 160 may yield an overhead stream 162, a first stream 166 comprising a diluent, and a second stream 164 comprising the diluent, an olefin monomer, and hydrogen. At least a portion of the diluent of the first stream 166 may flow to the first polymerization reactor 110. At least a portion of the diluent, at least a portion of the olefin monomer, and at least a portion of the hydrogen of the second stream 164 may flow to the second polymerization reactor 120.

The system 100 may additionally comprise any equipment associated with polymerization processes, such as but not limited to, one or more pumps, one or more control devices (e.g., a PID controller), one or more measurement instruments (e.g., thermocouples, transducers, and flow meters), alternative inlet and/or outlet lines, one or more valves, one or more reboilers, one or more condensers, one or more accumulators, one or more tanks, one or more filters, one or more compressors, one or more dryers, or combinations thereof.

Components of the system 100 are described in more detail below.

The first polymerization reactor 110 may be in fluid communication with the second polymerization reactor 120 via stream 114. Stream 114 (e.g., an effluent stream) may receive the polymerization product from the first polymerization reactor 110. Stream 130 (e.g., an effluent stream) may receive the polymerization product from the second polymerization reactor 120. The polymerization product may be withdrawn from the second polymerization reactor 120 and may flow through stream 130 to the separator 140. Stream 130, as discussed in more detail herein, may comprise various equipment (e.g., a continuous take-off valve, a flashline heater, etc.).

In one or more of the embodiments disclosed herein, the first polymerization reactor 110, the second polymerization reactor 120, or both, may comprise any vessel suitably configured to provide an environment for a chemical reaction (e.g., a contact zone) for monomers (e.g., ethylene) and/or polymers (e.g., an "active" or growing polymer chain), and optionally comonomers (e.g., 1-butene, 1-hexene, 1-octene, or combinations thereof) and/or copolymers, in the presence of a catalyst to yield a polymer (e.g., a polyethylene polymer) and/or copolymer.

The embodiment in FIG. 1 shows the first polymerization reactor 110 may be upstream of the second polymerization reactor 120. In alternative embodiments, the first polymerization reactor 110 may be downstream of the second polymerization reactor 120.

The polymerization processes performed in the reactor(s) disclosed herein (e.g., first polymerization reactor 110 and/or second polymerization reactor 120) may include batch or continuous processes. Continuous processes can use intermittent or continuous product discharge. Processes may also include partial or full direct recycle of unreacted monomer, unreacted comonomer, and/or diluent. Generally, continuous processes may comprise the continuous introduction of polymerization components into the first polymerization reactor 110, the second polymerization reactor 120, or both, and the continuous removal or withdrawal of a polymerization product from the first polymerization reactor 110 (e.g., via stream 114), the second polymerization reactor 120 (e.g., via stream 130), or both.

In embodiments, the system 100 may further comprise one or more motive devices, such as a pump, to circulate a polymerization medium (e.g., a polymerization product slurry) in the first polymerization reactor 110, the second polymerization reactor 120, or both. An example of a pump is an in-line axial flow pump with a pump impeller disposed within the interior of the first polymerization reactor 110 and/or an in-line axial flow pump with a pump impeller disposed within the interior of the second polymerization reactor 120. The impeller may, during operation, create a turbulent mixing zone within the polymerization medium (e.g., a slurry) circulating through the polymerization reactor such that sufficient contact between different polymerization components within the medium may occur. For example, the impeller may assist in propelling the a polymerization product medium through a closed loop of the first polymerization reactor 110 and/or second polymerization reactor 120 at sufficient speed to keep solid particulates, such as the catalyst or solid polymer, suspended within the reactor slurry. The impeller may be driven by a motor or other motive force.

In embodiments, the first polymerization reactor 110, the second polymerization reactor 120, or both may comprise a least one loop slurry polymerization reactor. In a loop slurry polymerization reactor, olefin monomers, and optionally olefin comonomers, may polymerize in the presence of a diluent and catalyst to make a polymerization product slurry comprising a solid phase and a liquid phase, wherein the solid phase comprises an olefin polymer (e.g., homopolymer or copolymer as described herein) having a density and/or molecular weight as disclosed herein. A loop slurry polymerization reactor may comprise vertical or horizontal pipes interconnected by smooth bends or elbows, which together form a loop. Portions of the first polymerization reactor 110, second polymerization reactor 120, or both, such as pipes thereof, may have cooling jackets placed therearound to remove excess heat generated by the exothermic polymerization reactions. A cooling fluid may be circulated through jackets, for example. Examples of loop slurry polymerization reactors and processes are disclosed in U.S. Pat. Nos. 3,248,179, 4,501,885, 5,565,175, 5,575,979, 6,239,235, 6,262,191, and 6,833,415, each of which is incorporated by reference in its entirety herein.

In embodiments, first polymerization reactor 110 and/or polymerization reactor 120 in system 100 may comprise a gas-phase reactor. Gas-phase reactors may comprise fluidized bed reactors or staged horizontal reactors. Gas-phase reactors may employ a continuous recycle stream containing one or more monomers continuously cycled through a fluidized catalyst bed under polymerization conditions. A recycle stream may be withdrawn from the fluidized bed and recycled back into the reactor. Simultaneously, polymerization product may be withdrawn from the reactor and fresh and/or recycled monomer may be added to replace the polymerized monomer. Likewise, copolymer product may optionally be withdrawn from the reactor and fresh and/or recycled comonomer may be added to replace polymerized comonomer. The reaction medium withdrawn from the gas-phase reactor may comprise a solid phase comprising the polymerization product and a gas-phase comprising monomer, optionally comonomer, and inert carrier gas(es). Examples of gas phase reactors and processes are disclosed in U.S. Pat. Nos. 5,352,749, 4,588,790 and 5,436,304, each of which is incorporated by reference in its entirety herein.

In embodiments the first polymerization reactor 110, the second polymerization reactor 120, or both may comprise a high pressure reactor. High pressure reactors may comprise autoclave or tubular reactors. Tubular reactors may have several zones where fresh monomer (optionally, comonomer), initiators, or catalysts may be added. Monomer (optionally, comonomer) may be entrained in an inert gaseous stream and introduced at one zone of the reactor. Initiators, catalysts, and/or catalyst components may be entrained in a gaseous stream and introduced at another zone of the reactor. The gas streams may be intermixed for polymerization. Heat and pressure may be employed appropriately to obtain optimal polymerization reaction conditions.

In embodiments, the first polymerization reactor 110, second polymerization reactor 120, or both may comprise a solution polymerization reactor wherein the monomer (optionally, comonomer) may be contacted with a catalyst composition by suitable stirring or other means. A carrier comprising an inert organic diluent or excess monomer (optionally, comonomer) may be employed. If desired, the monomer and/or optional comonomer may be brought in the vapor phase into contact with the catalytic reaction product, in the presence or absence of liquid material. The polymerization zone is maintained at temperatures and pressures that will result in the formation of a solution of the polymer in a reaction medium. Agitation may be employed to obtain better temperature control and to maintain uniform polymerization mixtures throughout the polymerization zone. Adequate means are utilized for dissipating the exothermic heat of polymerization. The reaction medium withdrawn from the solution polymerization reactor may comprise the polymerization product comprising a solid phase, a liquid phase comprising monomer (optionally, comonomer) and/or diluent, a gas phase comprising monomer (optionally, comonomer) and/or diluent, or combinations thereof.

Although the embodiment illustrated in FIG. 1 shows a single reactor for first polymerization reactor 110, the first polymerization reactor 110 may comprise any suitable number and/or type of reactors. Likewise, although the embodiment of FIG. 1 shows a single reactor for second polymerization reactor 120, the second polymerization reactor 120 may comprise any suitable number and/or type of reactors.

In embodiments of the disclosed system 100, production of the polymerization product may occur in at least two stages (e.g., in at least the first polymerization reactor 110 and the second polymerization reactor 120). For example, the first polymerization reactor 110 may yield a first component of the solid polymer in the polymerization product resulting from a first set of polymerization conditions in the first polymerization reactor 110, and the second polymerization reactor 120 may yield a second component of the solid polymer in the polymerization product resulting from a second set of polymerization conditions in the second polymerization reactor 120. The first set of polymerization conditions may be the same, similar to, or different than the second set of polymerization conditions. In embodiments, the first polymerization reactor 110 may comprise one or more catalysts to yield the first component of the solid polymer in the polymerization product, and the second polymerization reactor 120 may comprise one or more catalysts to yield the second component of the solid polymer in the polymerization product, wherein the one or more catalysts of the first polymerization reactor 110 may be the same or different from the one or more catalysts of the second polymerization reactor 120.

In embodiments, polymerization in multiple reactors may include the transfer of polymerization product (e.g., manually or via stream 114) from one polymerization reactor to a subsequent reactor for continued polymerization (e.g., as a polymerization product slurry, as a mixture, as solid polymer, or combinations thereof). Multiple reactor systems may include any combination including, but not limited to, multiple loop reactors, a combination of loop and gas reactors, multiple high pressure reactors or a combination of high pressure with loop and/or gas reactors. The multiple reactors may be operated in series, in parallel, or combinations thereof.

In embodiments, the first component of the solid polymer of the polymerization product may have a molecular weight greater than a molecular weight of the second component of the solid polymer of the polymerization product. Additionally or alternatively, the first component of the solid polymer of the polymerization product may have a density less than a density of the second component of the solid polymer of the polymerization product. In embodiments, the first component is a linear low density polyethylene (LLDPE). In embodiments, the second component is a high density polyethylene (HDPE).

In an embodiment, the first component may have a density about equal to or less than 0.927 g/cm$^3$. In additional or alternative embodiments, the second component may have a density about equal to or greater than 0.960 g/cm$^3$.

In an embodiment, the first component may have an HLMI about equal to or less than 0.3. In additional or alternative embodiments, the second component may have an HLMI about equal to or greater than about 10.

In embodiments, the solid polymer may comprise a polyethylene homopolymer and/or a copolymer (e.g., polyethylene copolymer). For example, the solid polymer may comprise a polyethylene homopolymer or copolymer in stream 114 (after the first component of the solid polymer is formed in the first polymerization reactor 110 and before the second component of the solid polymer is formed in the second polymerization reactor 120), and the solid polymer may comprise a polyethylene homopolymer or copolymer in stream 130 (after the second component of the solid polymer is formed in the second polymerization reactor 120).

In embodiments, the solid polymer in the polymerization product may comprise a multimodal polyethylene. The term "multimodal" means herein, unless otherwise stated, multimodality with respect to molecular weight distribution and includes therefore a bimodal polymer. In embodiments, a polyethylene comprising at least two components, which have been produced according to the disclosure result in different molecular weights (e.g., a first component which has a different molecular weight than a second component) and molecular weight distributions for the components of the solid polymer (e.g., the first component and the second component), is referred to as "multimodal." The prefix "multi" relates to the number of different polymer components present in the solid polymer. Thus, for example, multimodal polymer includes so called "bimodal" polymer consisting of two components.

Conditions of a polymerization reactor, e.g., first polymerization reactor 110, second polymerization reactor 120, or both, may be chosen and controlled for polymerization efficiency and to provide resin properties include temperature, pressure, catalyst selection, and the concentrations of various reactants.

Polymerization temperature can affect catalyst productivity, polymer molecular weight and molecular weight distribution. Suitable polymerization temperature may be any temperature below the de-polymerization temperature according to the Gibbs Free energy equation. Typically this includes from about 60° C. to about 280° C., for example, and from about 70° C. to about 110° C., depending upon the type of polymerization and/or reactor.

Suitable pressures will also vary according to the reactor and/or polymerization type. The pressure for liquid phase polymerizations in a loop reactor such as loop slurry polymerization reactor 110 is typically less than 1,000 psig, for example, about 650 psig. Pressure for gas phase polymerization is usually at about 100 to 500 psig. High pressure polymerization in tubular or autoclave reactors is generally run at about 20,000 to 75,000 psig.

Polymerization reactors can also be operated in a supercritical region occurring at generally higher temperatures and pressures. Operation above the critical point of a pressure/temperature diagram (supercritical phase) may offer advantages.

In an embodiment, polymerization may occur in an environment having a suitable combination of temperature and pressure. For example, polymerization may occur at a pressure in a range of about 400 psi to about 1,000 psi; alternatively, about 550 psi to about 650 psi, alternatively, about 600 psi to about 625 psi; in combination with a temperature in a range of about 130° F. to about 150° F., alternatively, from about 120° F. to about 196° F.

Polymerization reaction components of the reactor(s) disclosed herein (e.g., first polymerization reactor 110, second polymerization reactor 120, or both) may include an olefin monomer, an olefin comonomer, a diluent, a molecular weight control agent, a catalyst, a co-catalyst, other co-reactants or additives known to those skilled in the art with the aid of this disclosure, or combinations thereof. The concentration of various reaction components can be controlled to produce a solid polymer in the polymerization product with certain physical and mechanical properties. Additionally, the concentration of various reaction components can be used to control ethylene efficiency.

In embodiments, a monomer may comprise an olefin. In additional or alternative embodiments, a monomer may comprise an alpha olefin. Suitable olefins include, but are not limited to, ethylene and propylene.

In embodiments, a comonomer may comprise an unsaturated olefin having 3 to 12 carbon atoms. For example, suitable comonomers may include, but are not limited to, propylene, 1-butene, 1-hexene, 1-octene, or combinations thereof.

In embodiments, a diluent may comprise unsaturated hydrocarbons having 3 to 12 carbon atoms. In embodiments, suitable diluents may include, but are not limited to, the monomer being polymerized (examples described above), the comonomer being polymerized (examples described above), hydrocarbons that are liquids under reaction conditions, or combinations thereof. Further examples of suitable diluents include, but are not limited to, propane, cyclohexane, isobutane, n-butane, n-pentane, isopentane, neopentane, n-hexane, or combinations thereof. Some loop polymerization reactions can occur under bulk conditions where no diluent is used. An example is polymerization of propylene monomer as disclosed in U.S. Pat. No. 5,455,314, which is incorporated by reference herein in its entirety.

In embodiments, a suitable catalyst system for polymerizing the monomers and any comonomers may include, but is not limited to a catalyst(s) and, optionally, a co-catalyst(s) and/or a promoter(s). Nonlimiting examples of suitable catalyst systems include Ziegler Natta catalysts, Ziegler catalysts, chromium catalysts, chromium oxide catalysts, chromocene catalysts, metallocene catalysts, nickel catalysts, or combinations thereof. Nonlimiting examples of co-catalyst include triethylboron, methylaluminoxane, alkyls such as triethylaluminum, or combinations thereof. Suitable activator-supports may comprise solid super acid compounds. Catalyst systems suitable for use in this disclosure have been described, for example, in U.S. Pat. No. 7,619,047 and U.S. Patent Application Publication Nos. 2007/0197374, 2009/0004417, 2010/0029872, 2006/0094590, and 2010/0041842, each of which is incorporated by reference herein in its entirety.

In embodiments, a molecular weight control agent may comprise hydrogen, cocatalyst, modifiers, other polymerization reaction components recognized by one skilled in the art with the aid of this disclosure, or combinations thereof.

In an embodiment of the system 100 and process disclosed herein, the olefin monomer may comprise ethylene, the olefin comonomer may comprise 1-hexene, the diluent may comprise isobutane, the solid polymer in the polymerization product may comprise a multimodal polyethylene, the one or more catalysts of the reactors 110 and/or 120 may comprise metallocene, dual metallocene, Ziegler Natta, chromium-based catalyst, or combinations thereof.

The concentrations and/or partial pressures of monomer, comonomer, hydrogen, co-catalyst, modifiers, and electron donors are important in producing these resin properties. In embodiments, comonomer may be used to control a density of the at least one component of the solid polymer in the polymerization product; hydrogen may be used to control the molecular weight of the at least one component of the solid polymer in the polymerization product; cocatalysts can be used to alkylate, scavenge poisons and control molecular weight of the at least one component of the solid polymer in the polymerization product; activator-support can be used to activate and support the catalyst; modifiers can be used to control product properties of the at least one component of the solid polymer in the polymerization product; electron donors can be used to affect stereoregularity, the molecular weight distribution, or molecular weight of the at least one component of the solid polymer in the polymerization product; or combinations thereof. In additional or alternative embodiments, the concentration of poisons may be minimized because poisons impact the reactions and product properties.

In embodiments, the concentration of inert materials in the second polymerization reactor 120 may comprise up to about 2% by weight of the polymerization medium.

The polymerization reaction components may be introduced to an interior of the first polymerization reactor 110, the second polymerization reactor 120, or both, via inlets or conduits at specified locations (e.g., feed stream 112, feed stream 122, or both). The reaction components identified above (and others known to those skilled in the art with the aid of this disclosure) may form a suspension, i.e., a reactor slurry, that circulates through the first polymerization reactor 110, the second polymerization reactor 120, or both.

The polymerization product may be withdrawn from the one or more polymerization reactors present in system 100. Generally, the polymerization product may be transferred through the stream 114 (e.g., an effluent stream of the first polymerization reactor 110 or the second polymerization reactor 120) from one reactor to another (e.g., from first polymerization reactor 110 to second polymerization reactor 120 when first polymerization reactor 110 is upstream of the second polymerization reactor 120; from second polymerization reactor 120 to the first polymerization reactor 110 when the second polymerization reactor 120 is upstream of the first polymerization reactor 110). The polymerization product may be withdrawn from the downstream reactor (e.g., first polymerization reactor 110 or second polymerization reactor 120) via stream 130 and conveyed via stream 130 to the separator 140. In stream 130, the polymerization product may be conveyed via a drop in pressure. In embodiments, a portion, substantially all (e.g., 85, 86, 87, 88, 89, 90, 91, 92, 93, 94, 95, 96, 97, 98, 99, 99.9, 99.99%), or all (e.g., 100%) of liquid phase components present in the polymerization product are converted to gas phase components.

In embodiments, stream 130 of the system 100 may comprise a continuous take-off valve (hereinafter "CTO valve"). Additionally or alternatively, stream 130 may comprise a flashline heater. Examples of CTO valves and flashline heaters suitable for use in the disclosed system 100 are disclosed in U.S. Patent Application Publication No. 2013/0005929, U.S. patent application Ser. No. 13/664,944, and U.S. patent application Ser. No. 13/886,893, each of which is incorporated herein by reference in its entirety.

In embodiments, the polymerization product may comprise one or more of solid polymer, hydrogen, nitrogen, methane, ethylene, ethane, propylene, propane, butane, isobutane, pentane, hexane, 1-hexene, octane, 1-octene, and heavier hydrocarbons.

In embodiments, the polymerization product conveyed through stream 130 may be in the form of a slurry, a mixture, or a gas phase product mixture. The form of the polymerization product (e.g., slurry, mixture, or gas phase product mixture) may be a function of the conditions (e.g., temperature and/or pressure present at a given location in the stream 130, reactor type, catalyst selection, a drop in pressure associated with a CTO valve in the stream 130, a heat zone associated with a flashline heater in the stream 130, or combinations thereof) in the system 100. For example, in stream 130, a slurry (e.g., having a liquid and solid phase) may convert to a mixture (e.g., having a solid, liquid, and vapor phase) which may then convert to the gas phase product mixture (e.g., having a solid and vapor phase). Alternatively, in stream 130, a slurry may convert directly to a gas phase product mixture. Alternatively, stream 130 may not comprise a slurry, and a mixture may convert to a gas phase product mixture, or stream 130 may only comprise a gas phase product mixture (e.g., when second polymerization reactor 120 comprises a gas phase reactor).

In an embodiment, the slurry may comprise solid polymer and liquid phase diluent and/or monomer/comonomer (e.g., unreacted). In an embodiment, the mixture may comprise a three-phase mixture comprising liquid and/or gaseous (e.g., vaporized) diluent, liquid and/or gaseous (e.g., vaporized) monomer/comonomer (e.g., unreacted), and solid polymer. In embodiments, the gas phase product mixture may comprise a solid polymer, gaseous (e.g., vaporized) diluent, and gaseous (e.g., vaporized) monomer/comonomer (e.g., unreacted).

In embodiments, the solid phase may comprise various solids, semi-solids, or combinations thereof. In an embodiment, the solid phase may comprise the solid polymer, a catalyst, a co-catalyst, or combinations thereof.

In embodiments, the liquid phase may comprise a diluent (e.g., unreacted diluent), monomer (e.g., unreacted monomer), comonomer (e.g., unreacted comonomer), or combinations thereof. In embodiments, the liquid phase may comprise ethylene in a range of from about 0.1% to about 15%, alternatively, from about 1.5% to about 5%, alternatively, about 2% to about 4% by total weight of the liquid phase of the polymerization product. Ethane may be present in a range of from about 0.001% to about 4%, alternatively, from about 0.2% to about 0.5% by total weight of the polymerization product. Isobutane may be present in a range from about 80% to about 98%, alternatively, from about 92% to about 96%, alternatively, about 95% by total weight of the polymerization product.

In embodiments, the vapor phase of the polymerization product may comprise the vaporized portion of the liquid phase. In embodiments, the vapor phase may comprise a diluent vapor (e.g., unreacted diluent vapor), monomer vapor (e.g., unreacted monomer vapor), comonomer vapor (e.g., unreacted comonomer vapor), or combinations thereof.

As used herein, an "unreacted monomer," for example, ethylene, refers to a monomer that was introduced into a polymerization reactor during a polymerization reaction but was not incorporated into a polymer. In embodiments, the unreacted monomer may comprise ethylene, propylene, 1-butene, 1-hexene, 1-octene, a heavier hydrocarbon having a double-bonded carbon in the first position, or combinations thereof.

As used herein, an "unreacted comonomer," refers to a comonomer that was introduced into a polymerization reactor during a polymerization reaction but was not incorporated into a polymer. In embodiments, the unreacted comonomer may comprise propylene, 1-butene, 1-hexene, 1-octene, a heavier hydrocarbon having a double-bonded carbon in the first position, or combinations thereof.

In embodiments, a drop(s) in pressure of stream 130 may provide means of conveyance of the polymerization product between the polymerization reactors 110 and 120 and the separator 140.

In an embodiment, polymerization product in stream 130 may be heated to vaporize the liquid phase of the polymerization product during conveyance therethrough. For example, a flashline heater may heat the polymerization product conveyed through the stream 130 to vaporize at least a portion of the liquid phase of the polymerization product.

In embodiments, the drop(s) in pressure of the stream 130 may vaporize the liquid phase conveyed through the stream 130. In embodiments, the drop in pressure of the may vaporize a substantial amount (e.g., at least about 50%, 75%, 90%, 95%, 99%, 99.5%, 99.9%, 99.99%, 99.999%, or 100% by weight of component) of the liquid phase in the polymerization product (e.g., polymerization product slurry or mixture) prior to delivery to the separator 140. In an embodiment, the drop in pressure of stream 130 (e.g., associated with a CTO valve and/or flashline heater), a heating of stream 130 (e.g., heating of a portion(s) a flashline heater), or combinations thereof may vaporize at least about 50%, 75%, 90%, 95%, 99%, 99.5%, 99.9%, 99.99%, 99.999%, or 100% by weight of a component of the liquid phase, where the component is the diluent. In additional or alternative embodiment, the drop in pressure of stream 130 (e.g., associated with a CTO valve and/or flashline heater), the heating of the stream 130 (e.g., heating of a portion(s) of a flashline heater), or combinations thereof may vaporize at least about 50%, 75%, 90%, 95%, 99%, 99.5%, 99.9%, 99.99%, 99.999%, or 100% by weight of a component of the liquid phase, where the component is the comonomer (e.g., unreacted). In additional or alternative embodiment, the drop in pressure of the stream 130 (e.g., associated with the CTO valve and/or flashline heater), the heating of the stream 130 (e.g., heating of a portion(s) the flashline heater), or combinations thereof may vaporize at least about 50%, 75%, 90%, 95%, 99%, 99.5%, 99.9%, 99.99%, 99.999%, or 100% by weight of a component of the liquid phase, where the component is the monomer (e.g., unreacted). In additional or alternative embodiment, the drop in pressure of the stream 130 (e.g., associated with the CTO valve and/or the flashline heater), the heating of the stream 130 (e.g., heating of a portion(s) the flashline heater), or combinations thereof may vaporize at least about 50%, 75%, 90%, 95%, 99%, 99.5%, 99.9%, 99.99%, 99.999%, or 100% by weight of component of the liquid phase, where the component is hydrogen.

The separator 140 may recover solid polymer which is received from stream 130. In one or more of the embodiments disclosed herein, the polymerization product flowing from stream 130 (for example, a mixture of solid polymer and at least a portion, substantially all or all of the other components, e.g., diluent and/or unreacted monomer/comonomer, are in a gas phase) may be separated into solid polymer in product stream 144 and a vapor phase comprising one or more gases in stream 142 by the separator 140.

Any suitable technique may be used to separate the polymerization product to recover solid polymer. Suitable separation techniques include distilling, vaporizing, flashing, filtering, membrane screening, absorbing, adsorbing, cycloning, gravity settling, or combinations thereof, the polymerization product received in separator 140 from the stream 130.

The separator 140 may comprise a separation vessel capable of separating vapor, liquid, solid, or combinations thereof. Suitable embodiments of a separator may include a distillation column, a flash tank, a filter, a membrane, a reactor, an absorbent, an adsorbent, a molecular sieve, a cyclone, or combinations thereof. In an embodiment, the separator comprises a flash tank. Such a flash tank may comprise a vessel configured to vaporize and/or remove low vapor pressure components from a high temperature and/or high pressure fluid.

In an embodiment, the separator 140 may be configured such that polymerization product from stream 130 may be separated into solid polymer in product stream 144 substantially or completely free of any liquid phase components, and into a vapor phase comprising one or more gases in vapor stream 142.

In an embodiment, the separator 140 may be configured such that polymerization product from stream 130 may be separated into solid phase and liquid (e.g., a condensate) phase components in product stream 144 and a gas (e.g., vapor) phase components in vapor stream 142.

The solid phase may comprise solid polymer (e.g., polyethylene, optionally, a polyethylene copolymer).

The liquid phase or condensate may comprise any liquid phase components such as diluent and/or unreacted monomer/comonomer. In some embodiments, product stream 144 may comprise a concentrated slurry of the solid phase and liquid phase in comparison to the stream 130.

The gas or vapor phase of stream 142 may comprise vaporized solvents, diluent, unreacted monomers and/or optional unreacted comonomers, waste gases (e.g., secondary reaction products, such as contaminants and the like), or combinations thereof. In one or more embodiments, the vapor phase in vapor stream 142 may comprise hydrogen, nitrogen, methane, ethylene, ethane, propylene, propane, butane, 1-butene, isobutane, pentane, hexane, 1-hexene, heavier hydrocarbons, or combinations thereof. In an embodiment, ethylene may be present in a range of from about 0.1% to about 15%, alternatively, from about 1.5% to about 5%, alternatively, about 2% to about 4% by total weight of the stream. Ethane may be present in a range of from about 0.001% to about 4%, alternatively, from about 0.2% to about 0.5% by total weight of the stream. Isobutane may be present in a range from about 80% to about 98%, alternatively, from about 92% to about 96%, alternatively, about 95% by total weight of the stream.

The separator 140 may be configured such that the polymerization product flowing in the stream 130 is flashed by heat, pressure reduction, or combinations thereof such that the enthalpy of the line is increased. This may be accomplished via a heater (e.g., a flashline heater). For example, a flashline heater comprising a double pipe may exchange heat by hot water or steam may be utilized.

In an embodiment, the separator 140 may operate at a pressure of from about 50 psig to about 500 psig; alternatively, from about 130 psig to about 190 psig; alternatively, at about 150 psig; alternatively, at about 135 psig.

The separator 140 may additionally comprise any equipment associated with the separator 140, such as control devices (e.g., a PID controller) and measurement instruments (e.g., thermocouples), and level control and measurement devices.

In an embodiment, the horizontal distance between the separator 140 and the polymerization reactors 110 and/or 120 may be adjusted to optimize layout and cost. In an embodiment, the separator 140 which may be from about 0 to about 3,000 horizontal feet from the polymerization reactors 110 and/or 120; alternatively, the separator 140 may be from about 0 to about 1,500 horizontal feet from the polymerization reactors 110 and/or 120; alternatively, the separator 140 may be from about 100 to about 1,500 horizontal feet from the polymerization reactors 110 and/or 120; alternatively, the separator 140 may be from about 100 to about 500 horizontal feet from the polymerization reactors 110 and/or 120; alternatively, the separator 140 may be from about 100 to about 500 horizontal feet from the polymerization reactors 110 and/or 120. In various embodiments, the polymerization product may travel a linear distance through stream 130 in x, y, and z coordinates, for example through circuitous pipe routing, that is greater than the horizontal distance, the vertical spacing/distance, or combinations thereof.

In the first column 150, the vapor phase fed to the first column 150 via vapor stream 142, and optionally, any comonomer fed to the first column 150 via fresh comonomer stream 170 and/or any diluent fed to the first column 150 via fresh diluent stream 172, may be fractionated to yield a fraction stream 152 (e.g., depicted as an overhead stream of first column 150 in FIG. 1), a heavies stream (e.g., depicted as bottoms stream 156 in FIG. 1), and a comonomer stream (e.g., depicted as a side-draw stream 154 in FIG. 1).

The vapor phase in vapor stream 142 may be subject to compression (e.g., via a compressor) to an elevated pressure prior to introduction into the first column 150 such that the vapor stream 142 may comprise a gas phase, a liquid phase, or both. Vapor stream 142 may feed to a bottom, intermediate, or top portion of the first column 150.

In embodiments, the first column 150 may comprise a heavies column. The first column 150 (e.g., heavies column) may operate at conditions such that heavy components (e.g., components heavier than $C_6=$) are removed from the first column 150 via bottoms stream 156, olefin comonomer (e.g., $C_6=$) is removed from the first column 150 via side-draw stream 154, and light components (e.g., components lighter than $C_6=$) are removed from the first column 150 in the fraction stream 152. The light components in fraction stream 152 may include vaporized solvents, diluent, unreacted olefin monomer and/or optional unreacted olefin comonomer, waste gases (e.g., secondary reaction products, such as contaminants and the like), hydrogen, oxygen, nitrogen, methane, ethylene, ethane, propylene, propane, butane, 1-butene, isobutane, pentane, other light components known in the art with the aid of this disclosure, or combinations thereof. The heavy components may flow via stream 156 for further processing and/or use. Although not illustrated in FIG. 1, a portion of the bottoms stream 156 may be reboiled in a heat exchanger and returned to the bottom portion of the first column 150. In an alternative embodiment, the olefin comonomer may be removed from the first column 150 via bottoms stream 156. In an embodiment, the fraction stream 152 may include a compressor through which the light components flow, wherein the compressor may operate at a compression ratio of less than 3:1, for example, 2:1. Alternatively, the fraction stream 152 may not comprise a compressor.

In embodiments, the first column 150 may operate at a pressure of about 100 psig to about 250 psig. In an embodiment, operating within the disclosed pressure range may allow for operation of the first column 150 without a compressor in the fraction stream 152. In embodiments, the first column 150 may operate at an overhead temperature of about 100° F. to about 200° F. and at a bottoms temperature of about 300° F. to about 400° F.

In embodiments, fresh comonomer stream 170 may feed directly to the first column 150, indirectly to the first column 150 (e.g., via vapor stream 142), or both. The fresh comonomer stream 170 may comprise olefin comonomer, and optionally, at least one light component. The light component may comprise oxygen, nitrogen, air, methane, ethane, propane, or combinations thereof. The first column 150 may be configured to separate the comonomer from one or more other components fed to the first column 150 (e.g., one or more of the light components, fresh diluent, components of vapor stream 142, etc.). For example, the olefin comonomer may flow from the first column 150 via side-draw stream 154, heavy components may flow from the first column 150 via bottoms stream 156, and one or more light components including diluent and olefin monomer may flow from the first column 150 via fraction stream 152.

In embodiments, fresh diluent stream 172 may feed directly to the first column 150, indirectly to the first column 150 (e.g., via vapor stream 142), or both. The fresh diluent stream 152 may comprise diluent, and optionally, at least one light component. The light component may comprise oxygen, nitrogen, air, methane, ethane, propane, or combinations thereof. The first column 150 may be configured to separate the diluent from one or more other components fed to the first column 150 (e.g., one or more light components, fresh comonomer, components of vapor stream 142, etc.). For example, the diluent may flow from the first column 150 with one or more other light components via fraction stream 152, olefin comonomer may flow from the first column 150 via side-draw stream 154, and heavy components may flow from the first column 150 via bottoms stream 156.

In embodiments, the first column 150 may comprise a vessel having internal components such as distillation trays (e.g., sieve-type, dual-flow, bubble cap, donut), packing materials, or both. In an embodiment, the first column 150 comprises a distillation column.

In the second column 160, the components of the fraction stream 152 may be fractionated. In embodiments, the second column 160 may receive the fraction stream 152 (e.g., comprising $C_5$ and lighter components) from the first column 150 (e.g., the first column 150 and second column 160 may be connected in series). The fraction stream 152 may pass through various operating equipment such as a valve, a condenser, a cooler, an accumulator, a compressor, instrumentation known in the art with the aid of this disclosure, or combinations thereof before feeding to the second column 160. In an embodiment, the components of the fraction stream 152 may be compressed to a 2:1 ratio before entering the second column 160; alternatively, no compression of components is needed in fraction stream 152. In embodiments, the components of the fraction stream 152 may comprise a liquid phase, a gas phase, or both.

In embodiments, the second column 160 may comprise a lights column. The second column 160 may operate at conditions such that a first stream 166 (e.g., a bottoms stream) comprising substantially olefin-free diluent flows from the second column 160, a second stream 164 (e.g., a side-draw stream) comprising diluent, hydrogen, and olefin monomer (e.g., ethylene, propylene, or both) flows from the second column 160, and an overhead stream 162 comprising light components (e.g., oxygen, nitrogen, methane, ethane, propane, butane, pentane, waste gases, other components known in the art with the aid of this disclosure, or combinations thereof) flows from the second column 160. In embodiments, the overhead stream 162 may pass through various operating equipment such as a valve, a condenser, a cooler, an accumulator, a compressor, instrumentation known in the art with the aid of this disclosure, or combinations thereof. Although not illustrated in FIG. 1, a portion of the first stream 166 may be reboiled in a heat exchanger and returned to the bottom portion of the second column 160.

In embodiments, "substantially olefin-free" means less than about 10, 9, 8, 7, 6, 5, 4, 3, 2, 1, 0.9, 0.8, 0.7, 0.6, 0.5, 0.4, 0.3, 0.2, 0.1, 0.09, 0.08, 0.07, 0.06, 0.05, 0.04, 0.03, 0.02, 0.01 wt % olefin by weight of the first stream 166.

In embodiments, a concentration of hydrogen in the second stream 164 is at least 1 ppm. In additional or alternative embodiments, a concentration of hydrogen in the second stream 164 is from about 40 ppm to about 50 ppm. In additional or alternative embodiments, the concentration of hydrogen in the second stream 164 is less than 1 wt % by weight of the second stream 164. In additional or alternative embodiments, the second stream 164 may comprise greater than about 5, 6, 7, 8, 9, 10, or more wt % monomer (e.g., olefin monomer) by weight of the second stream 164. In additional or alternative embodiments, the second stream 164 may comprise greater than about 5 wt % monomer (e.g., olefin monomer) by weight of the second stream 164. In additional or alternative embodiments, the second stream 164 may comprise greater than about 10 wt % monomer (e.g., olefin monomer) by weight of the second stream 164.

In embodiments, the second column 160 may operate at a pressure of about 150 psig to about 350 psig. In embodiments, the second column 160 may operate at an overhead temperature of about −20° F. to about 105° F. and at a bottoms temperature of about 66° F. to about 250° F.; alternatively, the second column 160 may operate at an overhead temperature of about −10° F. to about 100° F. and at a bottoms temperature of about 66° F. to about 250° F.

In embodiments, the second column 160 may be configured to separate the diluent from the at least one light component. For example, the diluent may flow from the second column 160 via first stream 166, second stream 164, or both, and the at least one light component may flow from the second column 160 via overhead stream 162, second stream 164, or both.

In embodiments, the second column 160 may comprise a vessel having internal components such as distillation trays (e.g., sieve-type, dual-flow, bubble cap, donut), packing materials, or both. In an embodiment, the second column 160 comprises a distillation column.

In embodiments, the comonomer stream (e.g., side-draw stream 154) emitting from the first column 150 may recycle olefin comonomer to the first polymerization reactor 110, to the second polymerization reactor 120, or both (as depicted in FIG. 1). In embodiments where the comonomer stream is recycled to the first polymerization reactor 110 and/or second polymerization reactor 120, the comonomer stream may comprise one or more equipment comprising olefin comonomer recycle tanks operably connected with one or more of a comonomer recycle pump, a heat exchanger, a compressor, an accumulator, a valve, various instrumentation known in the art with the aid of this disclosure, or combinations thereof. The comonomer recycle tank(s) may collect comonomer flowing from the first column 150 for recycle to the first polymerization reactor 110 and/or second polymerization reactor 120. The one or more comonomer recycle pumps may manifold with each of the comonomer recycle tanks such that each pump may recycle comonomer from one or a combination of the tanks to the first polymerization reactor 110, the second polymerization reactor 120, or both.

In embodiments of the system 100 such as that shown in FIG. 1, the first stream 166 may recycle substantially olefin-free diluent to the first polymerization reactor 110, e.g., the reactor where the component of the solid polymer having a higher molecular weight and/or lower density is formed. In embodiments where the first stream 166 is recycled to the first polymerization reactor 110, the first stream 166 may comprise one or more equipment comprising diluent recycle tanks operably connected with one or more of a diluent recycle pump, a heat exchanger, a treater (e.g., an isobutane treater), a compressor, an accumulator, a valve, various instrumentation known in the art with the aid of this disclosure, or combinations thereof. The diluent recycle tank(s) may collect diluent flowing from the second column 160 for recycle to the first polymerization reactor 110 via first stream 166. The one or more diluent recycle pumps may manifold with each of the diluent recycle tanks such that each pump may recycle diluent from one or a combination of the tanks to the first polymerization reactor 110.

In embodiments of the system 100 such as that shown in FIG. 1, the second stream 164 may recycle monomer (e.g., olefin monomer), hydrogen, and diluent to the second polymerization reactor 120, e.g., the reactor where the component of the solid polymer having a lower molecular weight and/or higher density is formed. In embodiments where the second stream 164 is recycled to the second polymerization reactor 120, the second stream 164 may comprise equipment comprising recycle tanks operably connected with one or more of a recycle pump, a heat exchanger, a treater (e.g., an isobutane treater), a compressor, an accumulator, a valve, various instrumentation known in the art with the aid of this disclosure, or combinations thereof. The recycle tank(s) of second stream 164 may receive components comprising olefin monomer, hydrogen, and diluent flowing from the second column 160 for recycle to the second polymerization reactor 120 via second stream 164. The one or more pumps may manifold with each of the recycle tanks such that each pump may recycle the second stream 164 from one or a combination of the tanks to the second polymerization reactor 120.

Disclosed herein are embodiments of a polymerization process which may comprise producing a polymerization product (e.g., in first polymerization reactor 110, second polymerization reactor 120, or both); recovering a vapor phase from the polymerization product; fractionating the vapor phase in a first column 150 (e.g., to yield a fraction stream 152); fractionating the fraction stream in a second column 160; emitting a first stream 166 and a second stream 164 from the second column 160, wherein the first stream 166 comprises a diluent, wherein the second stream 164 comprises an olefin monomer, the diluent, and hydrogen; recycling at least a portion of the diluent of the first stream 166 to a first polymerization reactor 110; and recycling at least a portion of the diluent, at least a portion of the olefin monomer, and at least a portion of the hydrogen of the second stream 164 to a second polymerization reactor 120. The polymerization process may further comprise feeding fresh comonomer to the first column 150 (e.g., directly or indirectly as described herein), feeding fresh diluent to the first column 150 (e.g., directly or indirectly as described herein), or both. The process may further comprise fractionating the vapor phase in the first column 150 to yield a comonomer stream comprising olefin comonomer, and recycling at least a portion of the olefin comonomer in the comonomer stream to the first polymerization reactor 110, to the second polymerization reactor 120, or both.

The step of producing a polymerization product may comprise polymerizing the olefin monomer, and optionally an olefin comonomer, in the presence of the diluent to yield a first component of a solid polymer in the polymerization product in the first polymerization reactor; and polymerizing the olefin monomer, and optionally the olefin comonomer, in the presence of the diluent to yield a second component of the solid polymer of the polymerization product in the second polymerization reactor.

In embodiments of the process, the first component of the solid polymer of the polymerization product may have a molecular weight greater than a molecular weight of the second component of the solid polymer of the polymerization product. In additional or alternative embodiments of the process, the first component of the solid polymer of the polymerization product may have a density less than a density of the second component of the solid polymer of the polymerization product.

In embodiments of the process, the olefin monomer may comprise ethylene, the olefin comonomer may comprise 1-hexene, the diluent may comprise isobutane, the solid polymer may comprise a multimodal polyethylene, one or more catalysts of the first polymerization reactor 110 and/or second polymerization reactor 120 may comprise metallocene, dual metallocene, Ziegler Natta, chromium-based catalyst, or combinations thereof.

In embodiments of the process, the first stream 166 of the second column 160 may comprise a bottoms stream of the second column 160. In additional or alternative embodiments, the second stream 164 of the second column 160 may comprise a side-draw stream of the second column 160. In additional or alternative embodiments, the comonomer stream of the first column 150 may comprise a side-draw stream 154.

In embodiments, the disclosed process may comprise various additional or alternative steps consistent with the disclosure of the system 100 and process herein.

One or more of the disclosed embodiments improves the monomer efficiency (e.g., ethylene), diluent efficiency (e.g., isobutane), hydrogen efficiency, or combinations thereof over existing polymerization systems. Additionally, one or more of the disclosed embodiments may reduce or eliminate the need for a monomer (e.g., ethylene) recovery unit in the polymerization system 100, for example, because ethylene is recovered in second stream 164 of the second column 160 in an amount suitable for recycle to a polymerization reactor (e.g., first polymerization reactor 110). Additionally, one or more of the disclosed embodiments may reduce or eliminate the need for separate olefin-free systems, for example, because a substantially olefin-free diluent is recovered in the first stream 166 of the second column 160 which is suitable for recycle to a polymerization reactor (e.g., second polymerization reactor 120). Additionally, one or more of the disclosed embodiments may reduce or eliminate the need for compression of components in the fraction stream 152 (e.g., compression to a ratio of only 2:1 or no compression at all). Additionally, one or more of the disclosed embodiments allows for the presence of greater than 1 ppm hydrogen in the second stream 164 of the second column 160 (i.e., the need to strip hydrogen from the second stream 164 is eliminated). Additionally, the concentration of inert materials in the second polymerization reactor 120 may improve ethylene efficiency, i.e., reduce losses of ethylene.

ADDITIONAL DESCRIPTION

Embodiments of a system and process have been described. The following are a first set of nonlimiting, specific embodiments in accordance with the present disclosure:

Embodiment 1 is a polymerization process comprising producing a polymerization product; recovering a vapor phase from the polymerization product; fractionating the vapor phase in a first column to yield a fraction stream; fractionating the fraction stream in a second column; emitting a first stream and a second stream from the second column, wherein the first stream comprises a diluent, wherein the second stream comprises an olefin monomer, the diluent, and hydrogen; recycling at least a portion of the diluent of the first stream to a first polymerization reactor; and recycling at least a portion of the diluent, at least a portion of the olefin monomer, and at least a portion of the hydrogen of the second stream to a second polymerization reactor.

Embodiment 2 is the process of embodiment 1, wherein producing a polymerization product comprises:

polymerizing the olefin monomer, and optionally an olefin comonomer, in the presence of the diluent to yield a first component of a solid polymer of the polymerization product in a first polymerization reactor; and polymerizing the olefin monomer, and optionally the olefin comonomer, in the presence of the diluent to yield a second component of the solid polymer of the polymerization product in a second polymerization reactor.

Embodiment 3 is the process of embodiment 2, wherein the first component of the solid polymer of the polymerization product has a molecular weight greater than a molecular weight of the second component of the solid polymer of the polymerization product.

Embodiment 4 is the process of any of embodiments 2 to 3, wherein the first component of the solid polymer of the polymerization product has a density less than a density of the second component of the solid polymer of the polymerization product.

Embodiment 5 is the process of any of embodiments 2 to 5, wherein the olefin monomer comprises ethylene, wherein the olefin comonomer comprises 1-hexene, wherein the diluent comprises isobutane, wherein the solid polymer comprises a multimodal polyethylene.

Embodiment 6 is the process of any of embodiments 1 to 5, wherein the first stream comprises a bottoms stream of the second column, wherein the second stream comprises a side-draw stream of the second column.

Embodiment 7 is the process of any of embodiments 1 to 6, wherein a concentration of hydrogen in the second stream is at least 1 ppm.

Embodiment 8 is the process of any of embodiments 1 to 7, wherein the concentration of hydrogen in the second stream is less than about 1 wt % by weight of the second stream.

Embodiment 9 is the process of any of embodiments 1 to 8, further comprising feeding fresh olefin comonomer to the first column.

Embodiment 10 is the process of any of embodiments 1 to 9, further comprising feeding fresh diluent to the first column.

Embodiment 11 is the process of any of embodiments 1 to 10, wherein the second stream comprises greater than about 5 wt % monomer by weight of the second stream.

Embodiment 12 is the process of any of embodiments 1 to 11, wherein the second stream comprises greater than about 10 wt % monomer by weight of the second stream.

Embodiment 13 is the process of any of embodiments 1 to 12, wherein the first stream is substantially olefin-free.

Embodiment 14 is the process of any of embodiments 1 to 13, wherein the first column operates at a pressure ranging from about 100 psig to about 250 psig, wherein the fraction stream does not comprise a compressor.

Embodiment 15 is the process of any of embodiments 1 to 14, further comprising:
fractionating the vapor phase in the first column to yield a comonomer stream comprising olefin comonomer; and recycling at least a portion of the olefin comonomer of the comonomer stream to the first polymerization reactor, to the second polymerization reactor, or both.

Embodiment 16 is the process of embodiment 15, wherein the comonomer stream is a side-draw stream of the first column.

Embodiment 17 is an olefin polymerization system comprising:
a first polymerization reactor yielding a first component of solid polymer of a polymerization product;
a second polymerization reactor yielding a second component of the solid polymer of the polymerization product, wherein the second polymerization reactor is in fluid communication with the first polymerization reactor;
at least one separator receiving the polymerization product from the first polymerization reactor, the second polymerization reactor, or both, wherein the separator yields a vapor stream;
a first column receiving the vapor stream from the separator, wherein the first column yields a fraction stream; and
a second column receiving the fraction stream from the first column, wherein the second column yields a first stream comprising a diluent and a second stream comprising the diluent, an olefin monomer, and hydrogen;
wherein at least a portion of the diluent of the first stream flows to the first polymerization reactor,
wherein at least a portion of the diluent, at least a portion of the monomer, and at least a portion of the hydrogen of the second stream flows to the second polymerization reactor.

Embodiment 18 is the system of embodiment 17, wherein the first column yields a comonomer stream comprising olefin comonomer, wherein at least a portion of the olefin comonomer of the comonomer stream flows to the first polymerization reactor, to the second polymerization reactor, or both.

Embodiment 19 is the system of embodiment 18, wherein comonomer stream is a side-draw stream of the first column.

Embodiment 20 is the system of any of embodiments 17 to 19, wherein the first component of the solid polymer of the polymerization product has a molecular weight greater than a molecular weight of the second component of the solid polymer of the polymerization product.

Embodiment 21 is the system of any of embodiments 17 to 20, wherein the first component of the solid polymer of the polymerization product has a density less than a density of the second component of the solid polymer of the polymerization product.

Embodiment 22 is the system of any of embodiments 17 to 21, wherein a concentration of hydrogen in the second stream is at least 1 ppm.

Embodiment 23 is the system of any of embodiments 17 to 22, wherein the concentration of hydrogen in the second stream is less than 1 wt % by weight of the second stream.

Embodiment 24 is the system of any of embodiments 17 to 23, wherein the first stream is substantially olefin-free.

Embodiment 25 is the system of any of embodiments 17 to 24, further comprising a fresh comonomer stream fed to the first column.

Embodiment 26 is the system of embodiment 25, wherein the fresh comonomer stream comprises comonomer and at least one light component, wherein the first column separates the comonomer of the fresh comonomer stream from the at least one light component.

Embodiment 27 is the system of any of embodiments 17 to 26, further comprising a fresh diluent stream fed to the first column.

Embodiment 28 is the system of embodiment 27, wherein the fresh diluent stream comprises diluent and at least one light component, wherein the second column separates the diluent of the fresh diluent stream from the at least one light component.

Embodiment 29 is the system of any of embodiments 17 to 28, wherein the second stream comprises greater than about 5 wt % monomer by weight of the second stream.

Embodiment 30 is the process of any of embodiment 17 to 29, wherein the second stream comprises greater than about 10 wt % monomer by weight of the second stream.

Embodiment 31 is the system of any of embodiments 17 to 30, wherein the first stream comprises a bottoms stream of the second column, wherein the second stream comprises a side-draw stream of the second column.

Embodiment 32 is the system of any of embodiments 17 to 31, wherein the first polymerization reactor comprises a loop slurry polymerization reactor, wherein the second polymerization reactor comprises a loop slurry polymerization reactor.

Embodiment 33 is the system of any of embodiments 17 to 32, wherein the olefin monomer comprises ethylene, wherein the diluent comprises isobutane, wherein the polymerization product comprises a multimodal polyethylene.

Embodiment 34 is the system of any of embodiments 17 to 33, wherein the first polymerization reactor is upstream of the second polymerization reactor.

Embodiment 35 is the system of any of embodiments 17 to 34, wherein the first polymerization reactor is downstream of the second polymerization reactor.

Embodiment 36 is the system of any of embodiments 17 to 35, wherein the first column operates at a pressure ranging from about 100 psig to about 250 psig, wherein the fraction stream does not comprise a compressor.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference in the disclosure is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A polymerization process comprising;
   producing a polymerization product;
   recovering a vapor phase from the polymerization product;
   fractionating the vapor phase in a first column to yield a fraction stream;
   fractionating the fraction stream in a second column;
   emitting a first stream and a second stream from the second column, wherein the first stream comprises a diluent and is substantially olefin-free, and wherein the second stream comprises an olefin monomer, the diluent, and hydrogen;
   recycling at least a portion of the diluent of the first stream to a first polymerization reactor; and
   recycling at least a portion of the diluent, at least a portion of the olefin monomer, and at least a portion of the hydrogen of the second stream to a second polymerization reactor.

2. The process of claim 1, wherein producing a polymerization product comprises:
   polymerizing the olefin monomer, and optionally an olefin comonomer, in the presence of the diluent to yield a first component of a solid polymer of the polymerization product in a first polymerization reactor; and
   polymerizing the olefin monomer, and optionally the olefin comonomer, in the presence of the diluent to yield a second component of the solid polymer of the polymerization product in a second polymerization reactor.

3. The process of claim 2, wherein the olefin monomer comprises ethylene, wherein the olefin comonomer comprises 1-hexene, wherein the diluent comprises isobutane, and wherein the solid polymer comprises a multimodal polyethylene.

4. The process of claim 1, wherein the second stream is a side-draw stream of the second column, wherein a concentration of hydrogen in the second stream is at least 1 ppm.

5. The process of claim 1, wherein the second steam is a side-draw stream of the second column, wherein the concentration of hydrogen in the second stream is less than 1 wt % by weight of the second stream.

6. The process of claim 1, further comprising:
   feeding fresh diluent to the first column.

7. The process of claim 1, wherein the second stream is a side-draw stream, wherein the second stream comprises greater than 5 wt % monomer by weight of the second stream.

8. The process of claim 1, further comprising:
   emitting an overhead stream from the second column.

9. The process of claim 8, wherein the overhead stream comprises nitrogen, ethane, or a combination thereof.

10. An olefin polymerization system comprising:
    a first polymerization reactor yielding a first component of solid polymer of a polymerization product;
    a second polymerization reactor yielding a second component of the solid polymer of the polymerization product, wherein the second polymerization reactor is in fluid communication with the first polymerization reactor;
    at least one separator receiving the polymerization product from the first polymerization reactor, the second polymerization reactor, or both the first polymerization reactor and the second polymerization reactor, wherein the separator yields a vapor stream;
    a first column receiving the vapor stream from the separator, wherein the first column yields a fraction stream; and
    a second column receiving the fraction stream from the first column, wherein the second column yields a first stream comprising a diluent and a second stream comprising the diluent, an olefin monomer, and hydrogen,
    wherein the second stream is a side-draw stream of the second column, wherein a concentration of hydrogen in the second stream is at least 1 ppm;
    wherein at least a portion of the diluent of the first stream flows to the first polymerization reactor, and
    wherein at least a portion of the diluent, at least a portion of the monomer, and at least a portion of the hydrogen of the second stream flows to the second polymerization reactor.

11. The system of claim 10, wherein the second stream is a side-draw stream of the second column, and wherein the concentration of hydrogen in the second stream is less than 1 wt % by weight of the second stream.

12. The system of claim 10, wherein the first stream is substantially olefin-free.

13. The system of claim 10, further comprising:
a fresh diluent stream fed to the first column.

14. The system of claim 13, wherein the fresh diluent stream comprises diluent and at least one light component, wherein the second column separates the diluent of the fresh diluent stream from the at least one light component.

15. The system of claim 10, wherein the second stream is a side-draw stream of the second column, and wherein the second stream comprises greater than 5 wt % monomer by weight of the second stream.

16. The system of claim 10, wherein the second column yields an overhead stream comprising nitrogen, ethane, or a combination thereof.

17. The system of claim 10, wherein the first polymerization reactor comprises a loop slurry polymerization reactor, and wherein the second polymerization reactor comprises a loop slurry polymerization reactor.

18. The system of claim 10, wherein the olefin monomer comprises ethylene, wherein the diluent comprises isobutane, and wherein the polymerization product comprises a multimodal polyethylene.

19. A polymerization process comprising:
producing a polymerization product;
recovering a vapor phase from the polymerization product;
fractionating the vapor phase in a first column to yield a fraction stream;
fractionating the fraction stream in a second column;
emitting a first stream and a second stream from the second column, wherein the first stream comprises a diluent, wherein the second stream comprises an olefin monomer, the diluent, and hydrogen, and wherein the second stream is a side-drawn stream of the second column having a concentration of hydrogen of at least 1 ppm and less than 1 wt % by weight of the second stream;
recycling at least a portion of the diluent of the first stream to a first polymerization reactor; and
recycling at least a portion of the diluent, at least a portion of the olefin monomer, and at least a portion of the hydrogen of the second stream to a second polymerization reactor.

* * * * *